(12) United States Patent
Sood et al.

(10) Patent No.: US 12,724,006 B2
(45) Date of Patent: Sep. 1, 2026

(54) APPARATUS TO ISOLATE EXTERNAL VIBRATION FOR ELECTROPHORETIC MOBILITY MEASUREMENT

(71) Applicant: Wyatt Technology, LLC, Goleta, CA (US)

(72) Inventors: Siddharth Sood, Ventura, CA (US); Shiladitya Sen, Goleta, CA (US)

(73) Assignee: Wyatt Technology, LLC, Goleta, CA (US)

( * ) Notice: Subject to any disclaimer, the term of this patent is extended or adjusted under 35 U.S.C. 154(b) by 105 days.

(21) Appl. No.: 18/783,775

(22) Filed: Jul. 25, 2024

(65) Prior Publication Data

US 2025/0035582 A1 Jan. 30, 2025

Related U.S. Application Data

(60) Provisional application No. 63/529,415, filed on Jul. 28, 2023.

(51) Int. Cl.
*F16M 7/00* (2006.01)
*G01N 27/447* (2006.01)

(52) U.S. Cl.
CPC .............................. *G01N 27/44704* (2013.01)

(58) Field of Classification Search
CPC ... G01N 27/44704; F16F 3/0876; F16F 15/08
See application file for complete search history.

(56) References Cited

U.S. PATENT DOCUMENTS 4,583,912 A 4/1986 Ball et al.
4,778,037 A 10/1988 Papadopoulos
6,267,361 B1 7/2001 Rosenstrom
6,681,908 B2 1/2004 Davis
6,854,721 B2 2/2005 Kato et al.
(Continued)

FOREIGN PATENT DOCUMENTS

CN 210199683 U 3/2020
CN 212929473 U 4/2021
(Continued)

OTHER PUBLICATIONS

International Search Report and Written Opinion in PCT/US2024/039490 mailed on Nov. 15, 2024.
(Continued)

*Primary Examiner* — Amy J. Sterling
(74) *Attorney, Agent, or Firm* — Schmeiser Olsen, PLLC

(57) ABSTRACT

The present disclosure describes an apparatus to isolate external vibration for electrophoretic mobility measurement. In an exemplary embodiment, the apparatus includes at least three springs, (1) where each of the at least three springs includes (a) a top flexing ring, (b) a bottom flexing ring, (c) a plurality of outer rigid connectors, and (d) an inner rigid connector, (2) where the plurality of outer rigid connectors and the inner rigid connector couple the top flexing ring and the bottom flexing ring to each other, (3) where the inner rigid connector is connected to a surface of a chassis of an electrophoretic mobility measurement instrument, and (4) where the plurality of outer rigid connectors is connected to a ground surface of an enclosure of the instrument.

5 Claims, 6 Drawing Sheets

(56) References Cited

U.S. PATENT DOCUMENTS

| | | | | |
|---|---|---|---|---|
| 6,912,127 | B2 | 6/2005 | Hutchinson et al. | |
| 7,289,321 | B2 | 10/2007 | Patel et al. | |
| 7,410,039 | B2 | 8/2008 | Or et al. | |
| 7,415,397 | B2 | 8/2008 | Monson et al. | |
| 8,020,677 | B2 | 9/2011 | Hasegawa et al. | |
| 8,123,467 | B2 | 2/2012 | Lin | |
| 9,189,038 | B2 | 11/2015 | Hartman et al. | |
| 9,477,274 | B2 | 10/2016 | Hartman et al. | |
| 9,874,229 | B2 | 1/2018 | Chen et al. | |
| 9,897,158 | B2 * | 2/2018 | Ellen | F16F 1/36 |
| 10,221,993 | B2 | 3/2019 | Bullard et al. | |
| 10,379,372 | B2 * | 8/2019 | De Beule | G02B 7/14 |
| 11,255,347 | B2 | 2/2022 | Yang et al. | |
| 2003/0062230 | A1 | 4/2003 | Maeno et al. | |
| 2003/0183995 | A1 * | 10/2003 | Edberg | F16F 15/08 267/136 |
| 2007/0163885 | A1 | 7/2007 | Amano et al. | |
| 2007/0212939 | A1 | 9/2007 | Melz et al. | |
| 2007/0240308 | A1 | 10/2007 | Hutchinson et al. | |
| 2008/0237949 | A1 | 10/2008 | Hasegawa | |
| 2008/0302622 | A1 | 12/2008 | Ohtake et al. | |
| 2010/0142136 | A1 | 6/2010 | Bougaev et al. | |
| 2012/0210741 | A1 | 8/2012 | Fujiwara | |
| 2013/0199933 | A1 | 8/2013 | Tan et al. | |
| 2013/0299669 | A1 * | 11/2013 | Laurens | B64G 1/6425 248/573 |
| 2014/0334926 | A1 | 11/2014 | Sun | |
| 2023/0029076 | A1 | 1/2023 | Yang et al. | |

FOREIGN PATENT DOCUMENTS

| | | | |
|---|---|---|---|
| CN | 213511316 | U | 6/2021 |
| CN | 213655168 | U | 7/2021 |
| CN | 114776832 | A | 7/2022 |
| CN | 217689956 | U | 10/2022 |
| CN | 115898913 | A | 4/2023 |
| CN | 218956350 | U | 5/2023 |
| CN | 219176660 | U | 6/2023 |
| EP | 0274802 | B1 | 5/1993 |
| WO | 9102921 | A1 | 3/1991 |
| WO | 2013130910 | A1 | 9/2013 |
| WO | 2015161805 | A1 | 10/2015 |

OTHER PUBLICATIONS

International Search Report and Written Opinion in PCT/US2024/039497 mailed on Nov. 15, 2024.

Non-Final Office Action in U.S. Appl. No. 18/783,749 mailed on Apr. 6, 2026.

* cited by examiner

SECTION A-A

APPARATUS TO ISOLATE EXTERNAL VIBRATION FOR ELECTROPHORETIC MOBILITY MEASUREMENT

RELATED APPLICATION

This application claims priority to U.S. Provisional Patent Application No. 63/529,415 filed on Jul. 28, 2023 and titled "Apparatus to Isolate External Vibration for Electrophoretic Mobility Measurement", the entirety of which is incorporated by reference herein.

BACKGROUND

The present disclosure relates to electrophoretic mobility, and more specifically, to an apparatus to isolate external vibration for electrophoretic mobility measurement.

SUMMARY

The present disclosure describes an apparatus to isolate external vibration for electrophoretic mobility measurement. In an exemplary embodiment, the apparatus includes at least three springs, (1) where each of the at least three springs includes (a) a top flexing ring, (b) a bottom flexing ring, (c) a plurality of outer rigid connectors, and (d) an inner rigid connector, (2) where the plurality of outer rigid connectors and the inner rigid connector couple the top flexing ring and the bottom flexing ring to each other, (3) where the inner rigid connector is connected to a surface of a chassis of an electrophoretic mobility measurement instrument, and (4) where the plurality of outer rigid connectors is connected to a ground surface of an enclosure of the instrument.

DETAILED DESCRIPTION

Figure 1A:
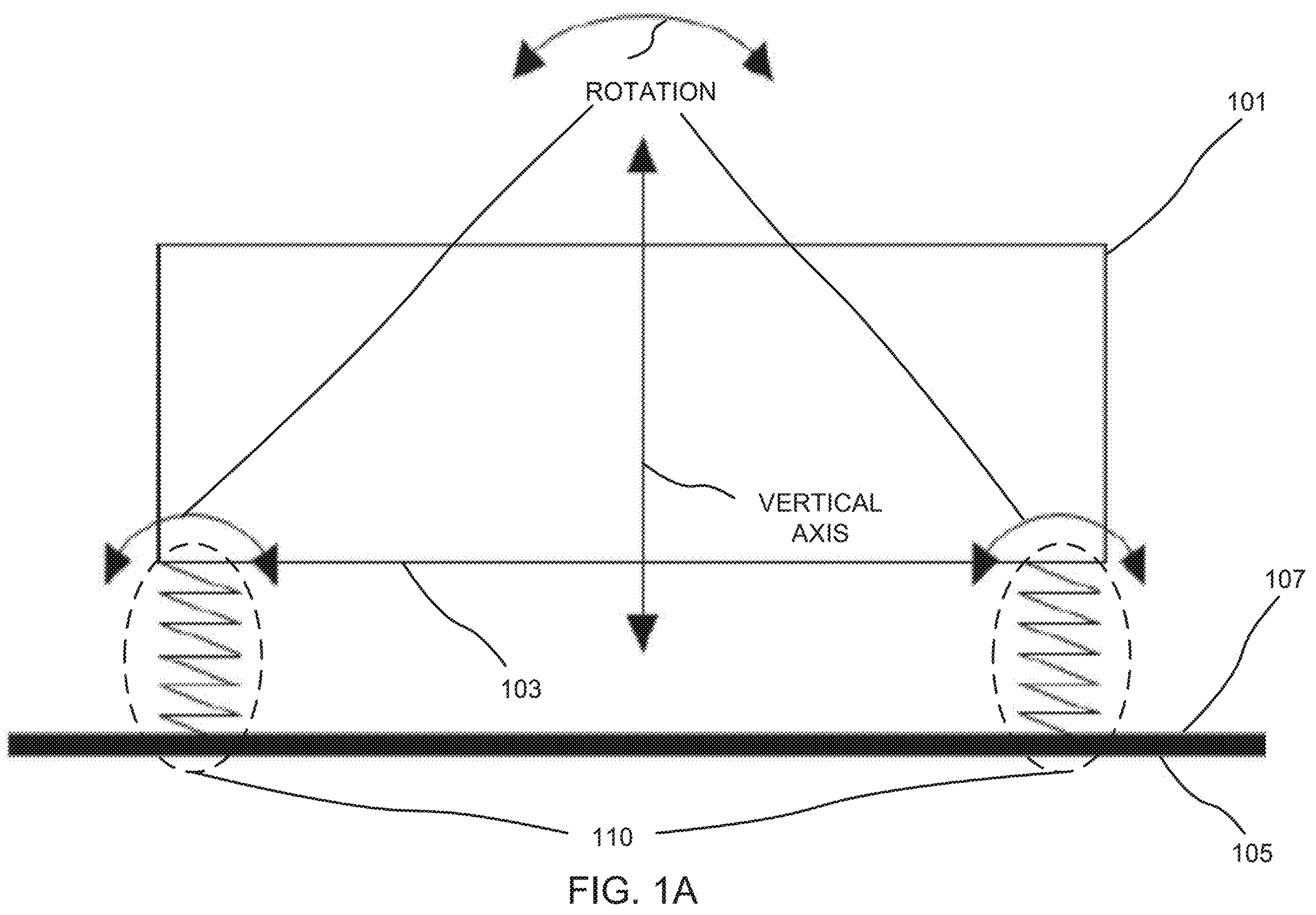
FIG. 1A depicts an apparatus in accordance with an exemplary embodiment.
Figure 1B:
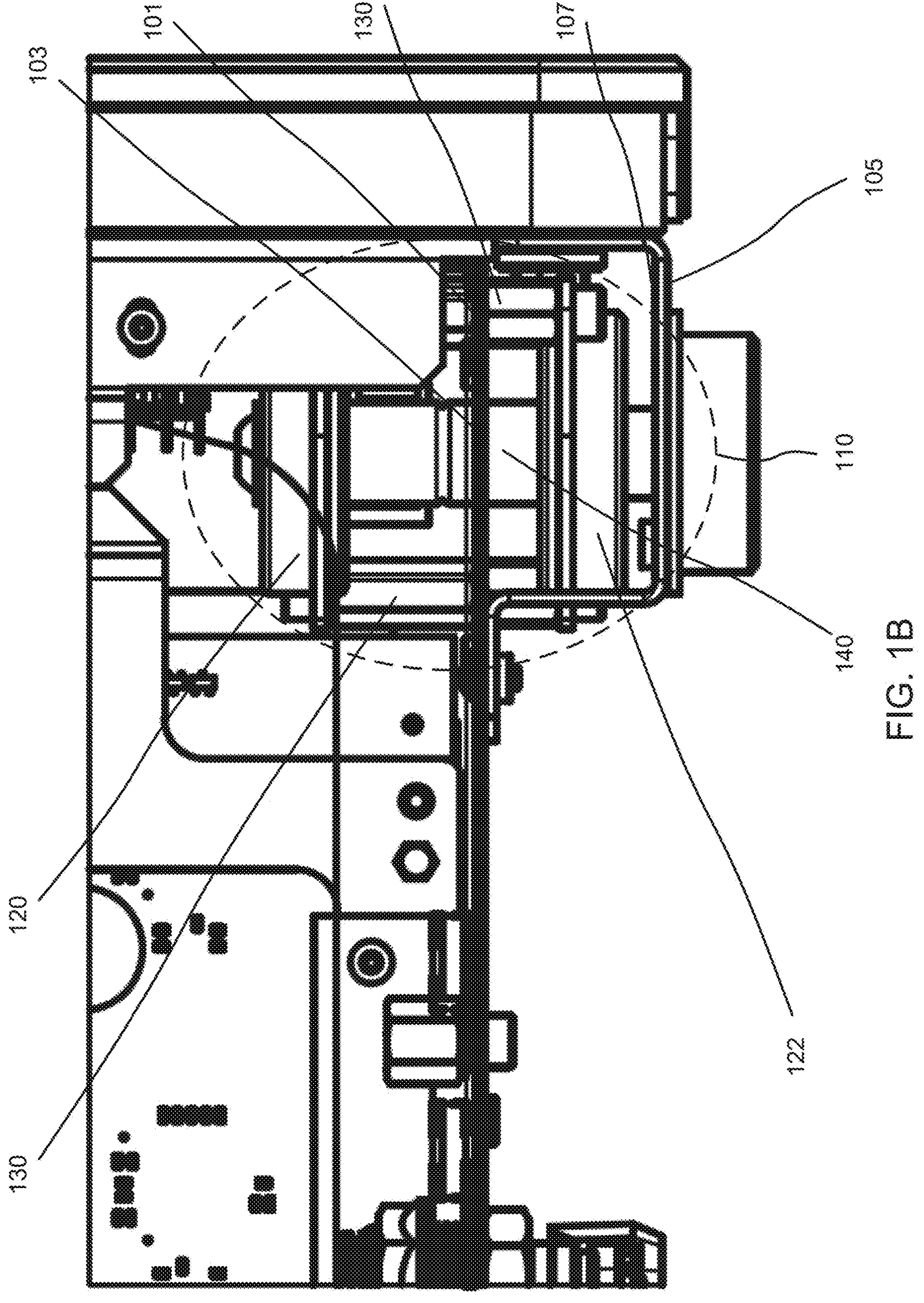
FIG. 1B depicts an apparatus in accordance with an exemplary embodiment.
Figure 1C:
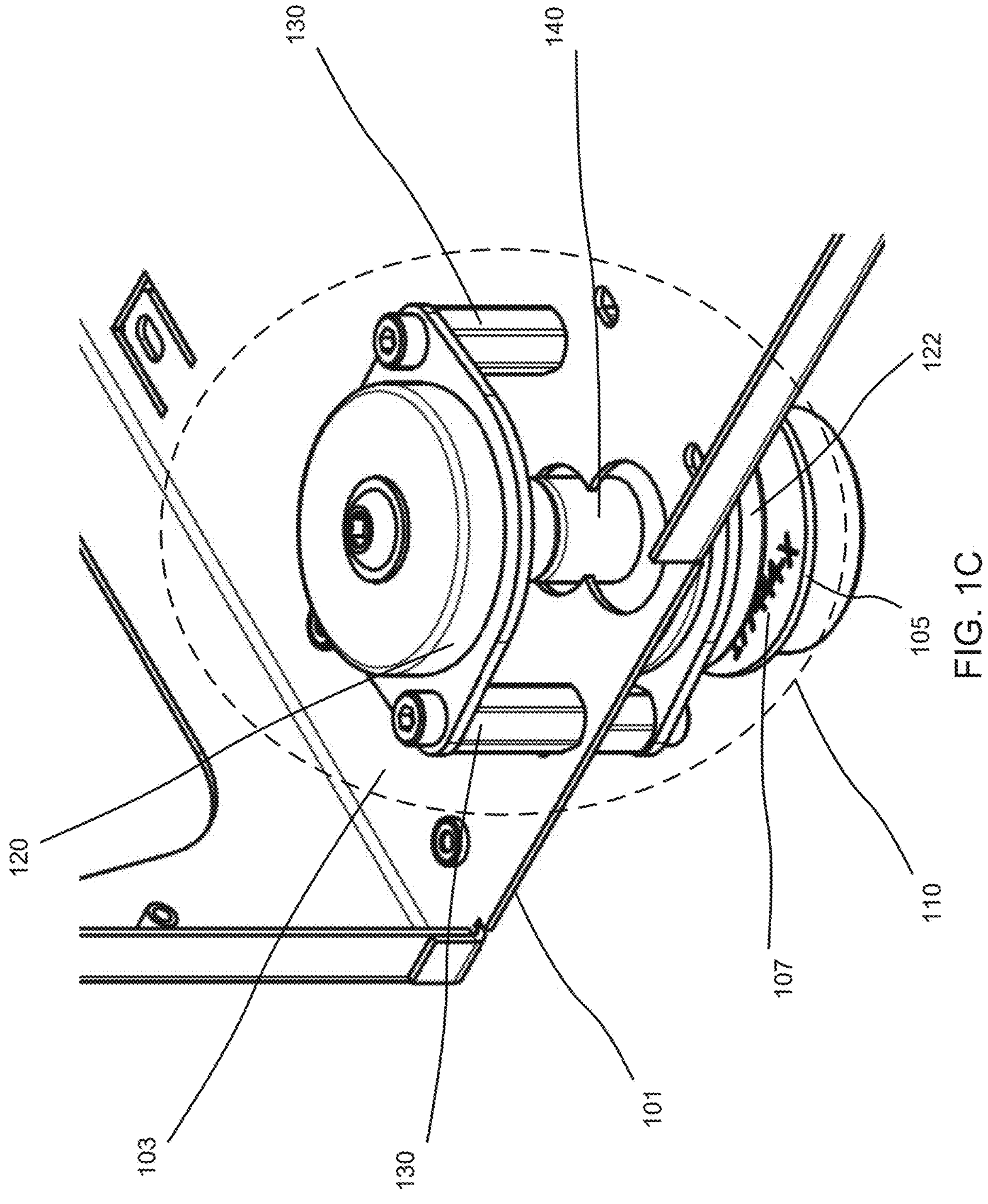
FIG. 1C depicts an apparatus in accordance with an exemplary embodiment.
Figure 1D:
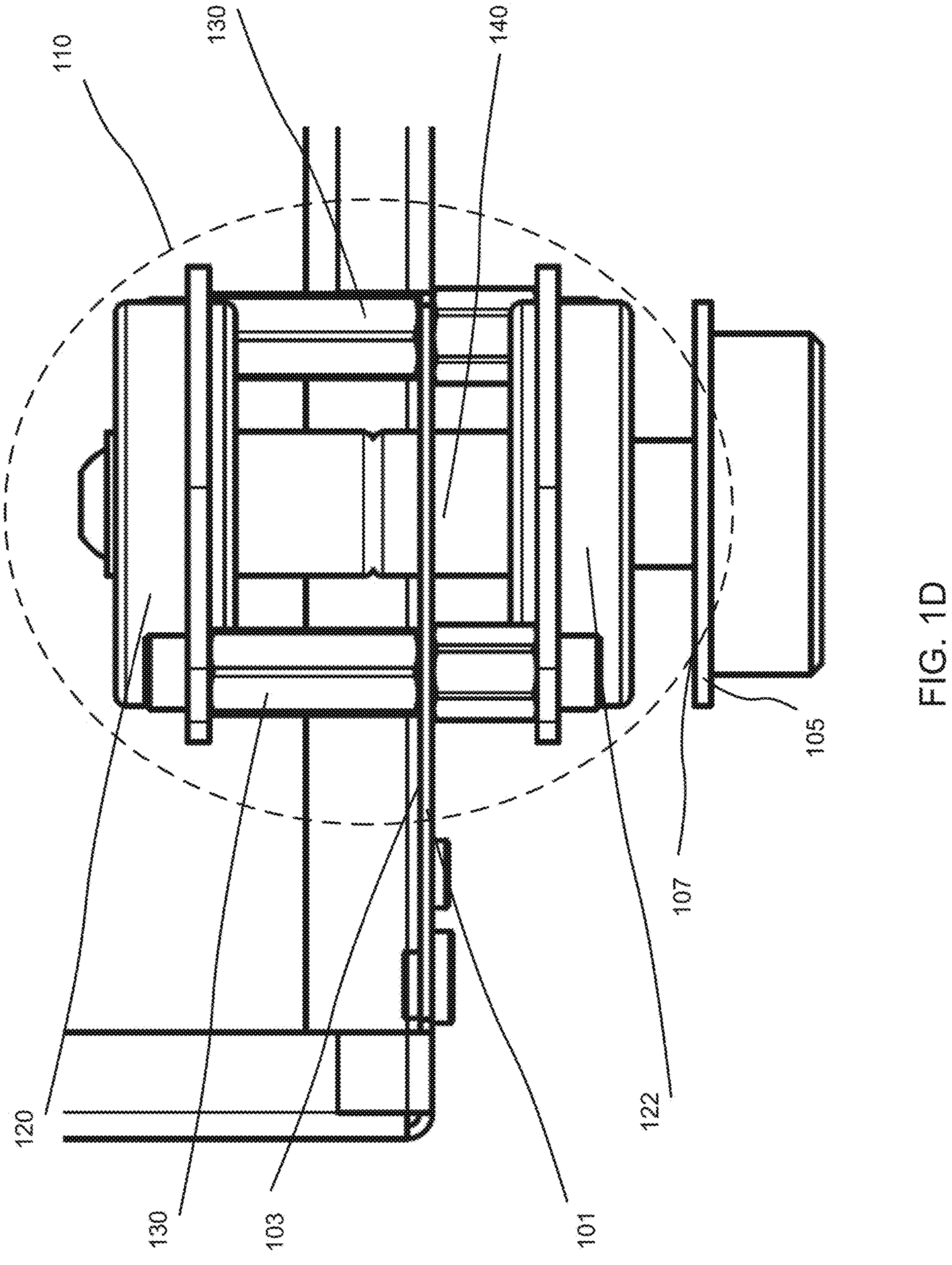
FIG. 1D depicts an apparatus in accordance with an exemplary embodiment.

The present disclosure describes an apparatus to isolate external vibration for electrophoretic mobility measurement. In an exemplary embodiment, the apparatus includes at least three springs, (1) where each of the at least three springs includes (a) a top flexing ring, (b) a bottom flexing ring, (c) a plurality of outer rigid connectors, and (d) an inner rigid connector, (2) where the plurality of outer rigid connectors and the inner rigid connector couple the top flexing ring and the bottom flexing ring to each other, (3) where the inner rigid connector is connected to a surface of a chassis of an electrophoretic mobility measurement instrument, and (4) where the plurality of outer rigid connectors is connected to a ground surface of an enclosure of the instrument. In an embodiment, each of the springs is a foot isolator. In an embodiment, each of the flexing rings is a center flexible portion of the spring. In an embodiment, each of the outer rigid connectors is a standoff.

In an embodiment, the apparatus maximizes the rotational/rocking stiffness of the instrument mount/mounting while preserving the low natural frequency in the vertical axis to minimize vertical stiffness. In an embodiment, the apparatus is modular, such that the apparatus is able to be easily integrated and recessed into the instrument. For example, the springs include off-the-shelf rubber isolators. In addition, the apparatus, in an embodiment, has a small footprint, allowing for relatively small feet under the instrument. In an embodiment, the height of the spring is recessed into the instrument. In an embodiment, the apparatus includes static molded plastic parts.

Definitions

Particle

A particle may be a constituent of a liquid sample aliquot. Such particles may be molecules of varying types and sizes, nanoparticles, virus like particles, liposomes, emulsions, bacteria, and colloids. These particles may range in size on the order of nanometer to microns.

Analysis of Macromolecular or Particle Species in Solution

The analysis of macromolecular or particle species in solution may be achieved by preparing a sample in an appropriate solvent and then injecting an aliquot thereof into a separation system such as a liquid chromatography (LC) column or field flow fractionation (FFF) channel where the different species of particles contained within the sample are separated into their various constituencies. Once separated, generally based on size, mass, or column affinity, the samples may be subjected to analysis by means of light scattering, refractive index, ultraviolet absorption, electrophoretic mobility, and viscometric response.

Light Scattering

Light scattering (LS) is a non-invasive technique for characterizing macromolecules and a wide range of particles in solution. The two types of light scattering detection frequently used for the characterization of macromolecules are static light scattering and dynamic light scattering.

Dynamic Light Scattering

Dynamic light scattering is also known as quasi-elastic light scattering (QELS) and photon correlation spectroscopy (PCS). In a DLS experiment, time-dependent fluctuations in the scattered light signal are measured using a fast photodetector. DLS measurements determine the diffusion coefficient of the molecules or particles, which can in turn be used to calculate their hydrodynamic radius.

Static Light Scattering

Static light scattering (SLS) includes a variety of techniques, such as single angle light scattering (SALS), dual angle light scattering (DALS), low angle light scattering (LALS), and multi-angle light scattering (MALS). SLS experiments generally involve the measurement of the absolute intensity of the light scattered from a sample in solution that is illuminated by a fine beam of light. Such measurement is often used, for appropriate classes of particles/molecules, to determine the size and structure of the sample molecules or particles, and, when combined with knowledge of the sample concentration, the determination of weight average molar mass. In addition, nonlinearity of the intensity of scattered light as a function of sample concentration may be used to measure interparticle interactions and associations.

Multi-Angle Light Scattering

Multi-angle light scattering (MALS) is a SLS technique for measuring the light scattered by a sample into a plurality of angles. It is used for determining both the absolute molar mass and the average size of molecules in solution, by detecting how they scatter light. Collimated light from a laser source is most often used, in which case the technique can be referred to as multiangle laser light scattering (MALLS). The "multi-angle" term refers to the detection of scattered light at different discrete angles as measured, for example, by a single detector moved over a range that includes the particular angles selected or an array of detectors fixed at specific angular locations.

A MALS measurement requires a set of ancillary elements. Most important among them is a collimated or focused light beam (usually from a laser source producing a collimated beam of monochromatic light) that illuminates a region of the sample. The beam is generally plane-polarized perpendicular to the plane of measurement, though other polarizations may be used especially when studying anisotropic particles. Another required element is an optical cell to hold the sample being measured. Alternatively, cells incorporating means to permit measurement of flowing samples may be employed. If single-particles scattering properties are to be measured, a means to introduce such particles one-at-a-time through the light beam at a point generally equidistant from the surrounding detectors must be provided.

Although most MALS-based measurements are performed in a plane containing a set of detectors usually equidistantly placed from a centrally located sample through which the illuminating beam passes, three-dimensional versions also have been developed where the detectors lie on the surface of a sphere with the sample controlled to pass through its center where it intersects the path of the incident light beam passing along a diameter of the sphere. The MALS technique generally collects multiplexed data sequentially from the outputs of a set of discrete detectors. The MALS light scattering photometer generally has a plurality of detectors.

Normalizing the signals captured by the photodetectors of a MALS detector at each angle may be necessary because different detectors in the MALS detector (i) may have slightly different quantum efficiencies and different gains, and (ii) may look at different geometrical scattering volumes. Without normalizing for these differences, the MALS detector results could be nonsensical and improperly weighted toward different detector angles.

Electrophoretic Light Scattering

Electrophoretic light scattering (ELS) is a technique used to measure the electrophoretic mobility of particles in dispersion, or molecules in solution. This mobility is often converted to Zeta potential to enable comparison of materials under different experimental conditions. The fundamental physical principle is that of electrophoresis. A dispersion is introduced into a cell containing two electrodes. An electrical field is applied to the electrodes, and particles or molecules that have a net charge, or more strictly a net zeta potential will migrate towards the oppositely charged electrode with a velocity, known as the mobility, that is related to their zeta potential.

When an electric field is applied to a sample, any charged objects in the sample will be influenced by that field. The extra movement that particles exhibit as a result of them experiencing the electric field is called the electrophoretic mobility. Its typical units are μm·cm/V·s (micrometer centimeter per Volt second) since it is a velocity [μm/s] per field strength [V/cm]. The electrophoretic mobility is the direct measurement from which the zeta potential can be derived (using either the Smoluchowski/Debye-Hückel approximations or the complete Henry function F(κa) to get from the mobility to a zeta potential).

Electrophoretic light scattering (ELS) involves applying an electric field to the sample in order to exert a force on the (charged) particles. In order to prevent the accumulation of charged particles onto the electrodes used to establish this electric field in an ELS measurement instrument, an alternating field is used, whose direction is switched (e.g., between positive and negative directions) rapidly enough to prevent charge build-up. During the application of a positive electric field, the sample acquires a positive velocity component, which leads to a positive Doppler frequency shift on the light that is scattered from the sample. During the application of a negative electric field, the sample acquires a velocity component in the opposite direction, which leads to a negative Doppler shift on the light that is scattered from the sample.

Current Technology

Current ELS measurement instruments may experience undesirable vibrations from external sources such as shaking of the instrument. Some current ELS instruments attempt to isolate such external vibrations by employing custom or off the shelf vibration isolators, where such isolators are typically selected to achieve the lowest natural frequency for a particular weight class corresponding to the instrument. For low weight instruments (e.g., ~50 lb), such isolation mechanisms typically have difficulty achieving desired natural frequencies of less than 20 Hz to isolate external vibrations.

In addition, at such low natural frequencies, the stiffness of the mount/mounting for the instrument typically becomes too low for general handling of the instrument and for robustness of the instrument. In particular, the rocking/rotational stiffness of the instrument mount/mounting about rotational axes contributes most to the perception of instrument "wobbliness", such that the instrument would be perceived to be wobbly if such rotational stiffness were too low. Also, in most cases, ground vibrations are transmitted only in a vertical direction along a vertical axis toward the instrument since work surfaces/tabletops upon which the instruments would be place are generally quite stiff in the lateral direction, thereby necessitating low vertical stiffness along the vertical axis for the instrument mount/mounting. Thus, there is a need for an apparatus to isolate external vibration for electrophoretic mobility measurement.

Referring to FIG. 1A, FIG. 1B, FIG. 1C, FIG. 1D, and FIG. 2A, in an exemplary embodiment, in exemplary embodiment, the apparatus includes at least three springs 110, (1) where each of the at least three springs 110 includes (a) a top flexing ring 120, (b) a bottom flexing ring 122, (c) a plurality of outer rigid connectors 130, and (d) an inner rigid connector 140, (2) where plurality of outer rigid connectors 130 and inner rigid connector 140 couple top flexing ring 120 and bottom flexing ring 122 to each other, (3) where inner rigid connector 140 is connected to a surface 103 of a chassis 101 of an electrophoretic mobility measurement instrument, and (4) where plurality of outer rigid connectors 130 is connected to a ground surface 107 of an enclosure 105 of the instrument.

Flexing Rings

In an embodiment, referring to FIG. 1B, FIG. 1C, FIG. 1D, FIG. 2A, and FIG. 2B, each of the flexing rings 120, 122 includes a diaphragm type isolator 200. For example, each of the flexing rings 120, 122 is a diaphragm type isolator 200. In an embodiment, isolator 200 includes material selected from the group consisting of rubber and plastic. In an embodiment, isolator 200 includes material that has structural dampening properties. In an embodiment, isolator 200 includes an annual ring 210. For example, isolator 200 is annual ring 210.

Rotational Stiffness

Figure 2A:
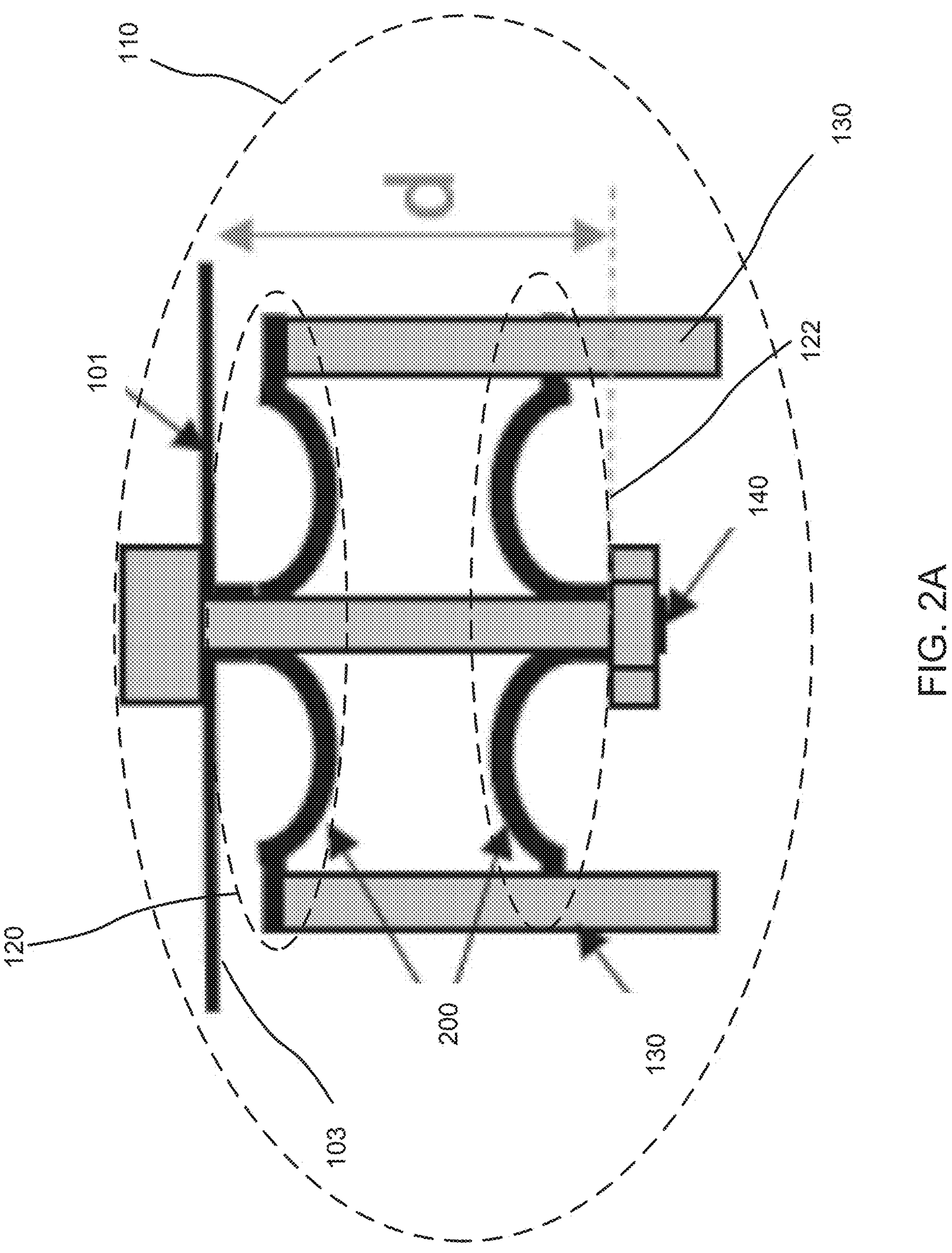
FIG. 2A depicts an apparatus in accordance with an embodiment.
Figure 2B:
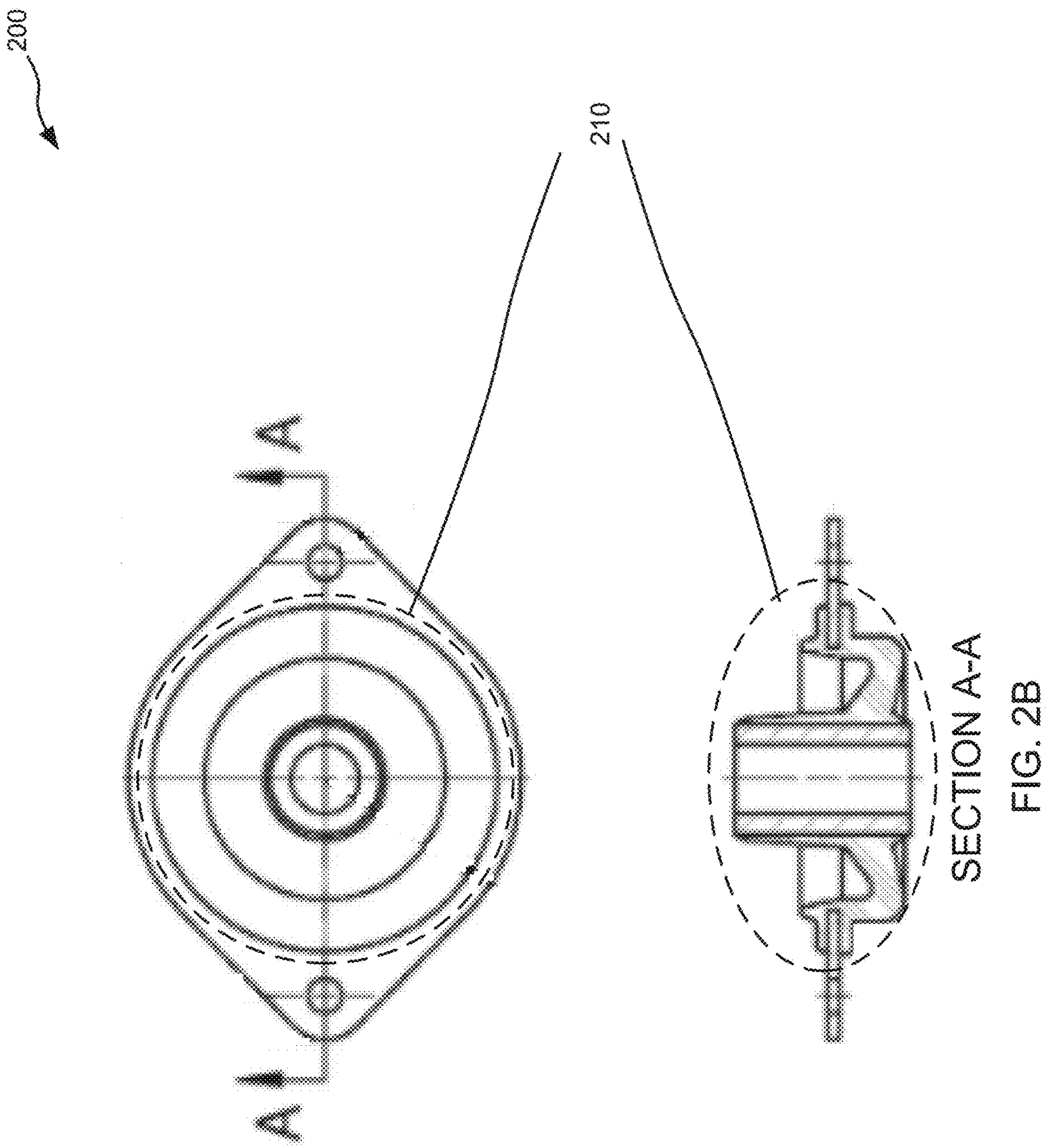
FIG. 2B depicts an apparatus in accordance with an embodiment.

In an embodiment, referring to FIG. 2A, each of at least three springs 110 is to separate surface 103 of chassis 101 from a bottom of bottom flexing ring 122 by a separation distance, d, resulting in rotational stiffness for chassis 101. In an embodiment, the separation distance, d, ranges from 0.5 inches to 3 inches. For example, a portion of d is indicative of the performance of the spring. In an embodiment, the rotational stiffness is increased by increasing the separation distance, d, (i.e., the height of the spring), where the rotational stiffness is proportional to the square of d. Moreover, since the rotational stiffness is proportional to $d^2$, the rotational stiffness could be increased significantly by increasing the height of flexing ring 120, 122. Also, a lot of the extra height could potentially be absorbed within the volume of the instrument with minimum stick-out from the bottom thereby preserving instrument appearance.

EXAMPLE

For example, the apparatus has been observed to maximize rocking/rotational stiffness for a certain vertical stiffness, as compared to off-the-shelf isolators. Also, it has been observed that the apparatus achieves superior vibration isolation, with single axis isolation, very low natural frequencies, and hence good low frequency vibration isolation. By coupling two multiplane flexing rings 120, 122, 200 together as shown in FIG. 1B, FIG. 1C, FIG. 1D, and FIG. 2A, the rotational stiffness was observed to be increased significantly while preserving low vertical stiffness.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. An apparatus comprising:

at least three springs, wherein each of the at least three springs comprises a top flexing ring, a bottom flexing ring, a plurality of outer rigid connectors, and an inner rigid connector, wherein the plurality of outer rigid connectors and the inner rigid connector couple the top flexing ring and the bottom flexing ring to each other, wherein the inner rigid connector is connected to a surface of a chassis of an electrophoretic mobility measurement instrument, and wherein the plurality of outer rigid connectors is connected to a ground surface of an enclosure of the instrument.

2. The apparatus of claim 1 wherein each of the flexing rings comprises a diaphragm type isolator.

3. The apparatus of claim 2 wherein the isolator comprises material selected from a group consisting of rubber and plastic.

4. The apparatus of claim 1 wherein the isolator comprises an annular ring.

5. The apparatus of claim 1 wherein the each of the at least three springs is to separate the surface of the chassis from a bottom of the bottom flexing ring by a separation distance, d, resulting in rotational stiffness for the chassis.

* * * * *